UNITED STATES PATENT OFFICE.

LEONARD T. STIASTNY, OF HOBOKEN, NEW JERSEY.

IMPROVED PROCESS FOR PREPARING REFUSE WOOL FOR USE.

Specification forming part of Letters Patent No. 45,768, dated January 3, 1865.

*To all whom it may concern:*

Be it known that I, LEONARD T. STIASTNY, of the city of Hoboken and State of New Jersey, have invented a new and Improved Method of Preparing Refuse of Wool for Use; and I hereby declare the following to be a full, clear, and exact description of my invention and of the manner of making, using, constructing, and compounding the same.

I deem it proper to state that all kinds of animal wool containing burr or similar vegetable substances are separated to a certain extent from said burr by methods and machines fully known; but the refuse of said wool is not entirely vegetable matter, but contains intermixed therewith a certain proportion of animal wool which, if extracted from said refuse, may be made useful for various purposes; and the reason why immense quantities of said refuse have been hitherto cast aside as useless is the fact that no method has been known to divest the said refuse of burr and other vegetable matter.

The nature of my invention therefore consists in separating the burr and other vegetable matter from the refuse of wool by the application thereto of heat and acids, as hereinafter described.

To enable others skilled in the art to make and use my invention, I will proceed to describe its construction and operation.

I place the refuse to be operated upon in a large chest containing a double bottom, the inner bottom being perforated and the top containing also small perforations. Between the two bottoms hot steam is admitted during about one hour, which, in ascending to the top of the chest, permeates the refuse and loosens the burr from the wool, and the steam or heat, after having performed its function, escapes through the perforations on the top. I then pump or force a stream of water into the chest through an aperture in or near the top of the chest, on one side, by the force of which the wool is driven toward the other side of the chest, where another aperture is provided with a net of wire, through which the wool is driven, leaving the comparatively large burr or other comparatively bulky vegetable matter behind, and driving the wool, water, and smaller vegetable matter into a second chest provided for that purpose. To destroy the remaining vegetable matters contained in the wool, I then strain all the water from the wool, and then introduce into said chest a liquor consisting of sulphuric acid, of about 10° Baumé, at a temperature of about 120° Fahrenheit, and leave the wool, which still contains vegetable substances, in this bath during about from five to ten hours, when the acid liquid is strained off. Then the wool is washed in a suitable wash-machine for the purpose of cleaning the wool from the chemical substances adhering to it. It is then placed in the known centrifugal machine. I then place it in a drying-machine, consisting of two concentric cylinders movable on the same axis, the outer cylinder being formed of thin sheet-iron or similar material and the inner cylinder of metallic wire-gauze or wire-net. The wool is placed into the inside cylinder, and the whole is slowly rotated and at the same time exposed to the action of heat. In this manner the vegetable parts still adhering to the wool are burned or coked without injury to the wool. I then subject it to the action of a usual devil or picker for the purpose of removing the dust (to which the vegetable substances are now reduced) from the wool, after which it is oiled and submitted to the action of the carding-machine in the usual well-known manner.

The wool thus obtained may be employed as hatters' wool, or it may be mixed with longer wool and then used for divers other purposes.

I am aware that it is not new to subject wool containing burr to an acid solution for the purpose of cleaning the same, and I therefore do not claim that part of the operation as my invention; but

What I claim, and desire to secure by Letters Patent, is—

1. The treatment of the wool, as described, by applying to it, in connection with the treatment of it by an acid solution, as described, but prior thereto, steam, in the manner substantially set forth.

2. In connection with the treatment of wool by an acid solution, as described, and after the said treatment is completed, the application of a high degree of heat to the wool during the drying process for the purpose of burning the vegetable parts which may still adhere to said wool, substantially as described.

L. T. STIASTNY.

Witnesses:
CHS. WEHLE,
A. WEHLE.